US007182392B2

(12) United States Patent
Sawajiri

(10) Patent No.: US 7,182,392 B2
(45) Date of Patent: Feb. 27, 2007

(54) LATCH DEVICE FOR VEHICLE ACCESS PANEL DOOR

(75) Inventor: Yukio Sawajiri, Yamanashi-ken (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 4 days.

(21) Appl. No.: 11/059,624

(22) Filed: Feb. 17, 2005

(65) Prior Publication Data

US 2006/0043762 A1 Mar. 2, 2006

(30) Foreign Application Priority Data

Feb. 17, 2004 (JP) ............................ 2004-040659

(51) Int. Cl.
*B60J 1/08* (2006.01)

(52) U.S. Cl. ....................... 296/146.1; 292/32; 292/33; 292/64; 292/333

(58) Field of Classification Search ............. 296/146.1, 296/147, 155; 292/32, 33, 64, 333, DIG. 3, 292/DIG. 46
See application file for complete search history.

(56) References Cited

U.S. PATENT DOCUMENTS

| | | | | |
|---|---|---|---|---|
| 4,930,836 | A | 6/1990 | Grinn | |
| 4,973,091 | A * | 11/1990 | Paulson et al. | 292/51 |
| 5,427,421 | A * | 6/1995 | Hamaguchi | 292/216 |
| 5,542,720 | A * | 8/1996 | Fleming | 292/32 |
| 5,803,516 | A | 9/1998 | Hempel | |
| 6,981,724 | B2 * | 1/2006 | Denys | 292/64 |
| 2003/0047947 | A1 * | 3/2003 | Spurr | 292/11 |
| 2003/0221596 | A1 * | 12/2003 | Guinan et al. | 109/24.1 |
| 2005/0194820 | A1 * | 9/2005 | Azzouz et al. | 296/193.05 |
| 2006/0043773 | A1 * | 3/2006 | Azzouz et al. | 296/202 |

* cited by examiner

*Primary Examiner*—Lori L. Coletta
(74) *Attorney, Agent, or Firm*—Browdy and Neimark, PLLC

(57) ABSTRACT

This latch device for an access panel door includes an open lever and a ratchet release lever pivotally mounted on a base plate by a first shaft, a lock lever pivotally mounted on the base plate by a second shaft, and a sliding pin displaceable between an engaged position and a disengaged potion. The release lever has first and second arms extending in a radial direction of the first shaft and connected to latch units. The lock lever shifts the sliding pin to an engaged position when the lock lever is in the unlocked position and shifts the sliding pin to a disengaged position when the lock lever is in the locked position. The sliding pin is slidably mounted in a slot formed on the first arm or the second arm.

1 Claim, 7 Drawing Sheets

LATCH DEVICE FOR VEHICLE ACCESS PANEL DOOR

FIELD OF THE INVENTION

The present invention relates to a door latch device, and more particularly to a latch device that is utilized for a vehicle access panel door (rear door of the double side door construction).

DESCRIPTION OF THE RELATED ART

Conventionally, an access panel door has been used most of the time as a door for the rear seat of pick-up trucks, which structure is described fully in U.S. Pat. No. 4,930,836.

The access panel door is desirable to have a structure in which opening of the access door is possible only when a front door is open. For this purpose, a door latch device used for such access panel door is constructed in a manner in which the door latch device is automatically turned to a substantively locked position when the front door is closed (U.S. Pat. No. 5,803,516).

Said prior art door latch device has the disadvantage that a number of components are required.

SUMMARY OF THE INVENTION

Accordingly, the object of the present invention is to provide a latch device for an access panel door having a reduced number of components.

DESCRIPTION OF THE PREFERRED EMBODIMENT

Figure 1:
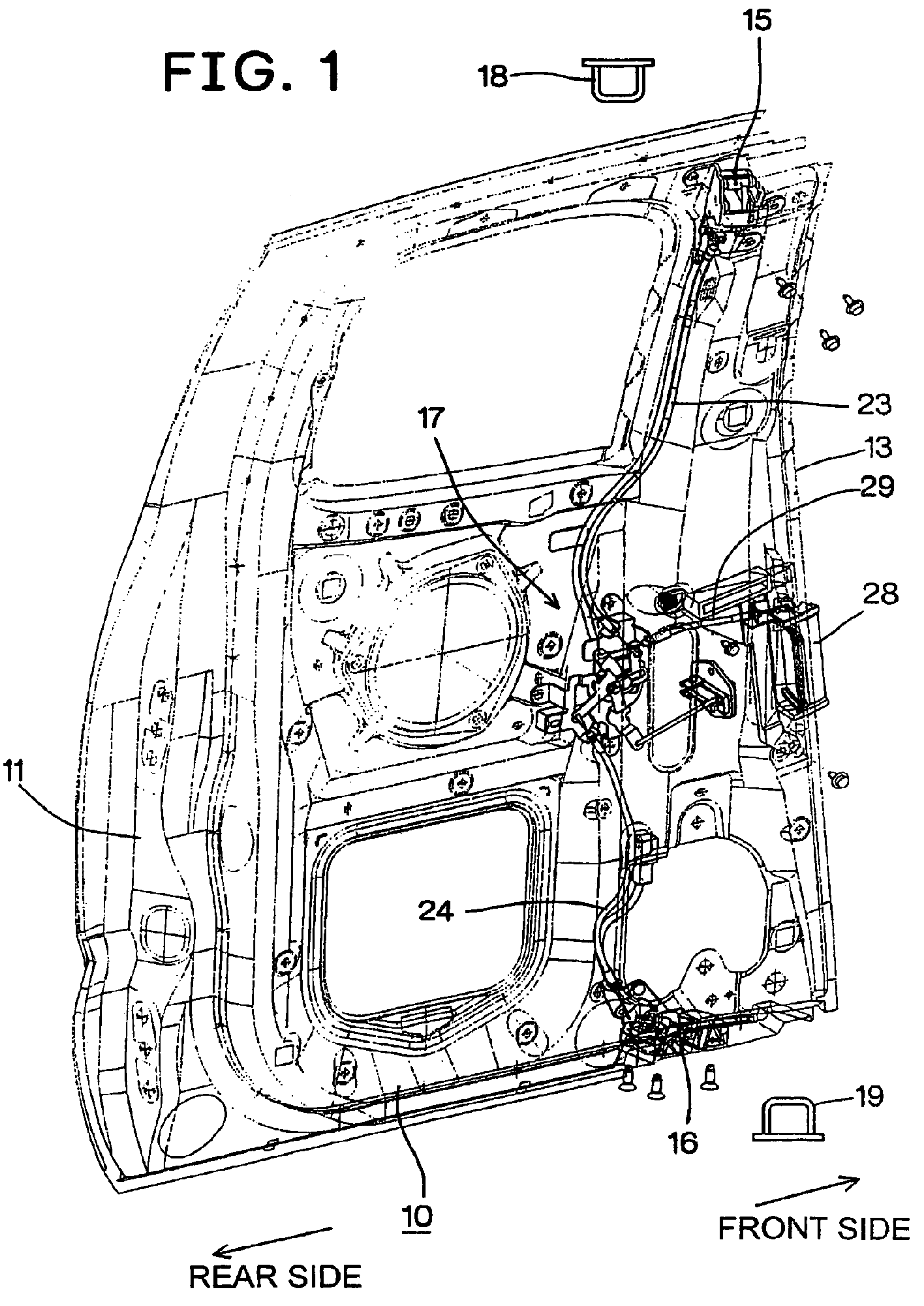
FIG. 1 is a perspective view showing the inner side of an access panel door (rear door) provided with a door latch device according to the present invention.

A first embodiment of the present invention will now be explained. FIG. 1 shows an inner side of a rear door (access panel door) 10 provided with a door latch device according to the present invention, in which a rear edge 11 of the rear door 10 is pivotally mounted on a vehicle body by a hinge and the like. A front door 12 (FIG. 9) is mounted on the vehicle body by a hinge so as to rotate about its front edge as is well known.

Figure 9:
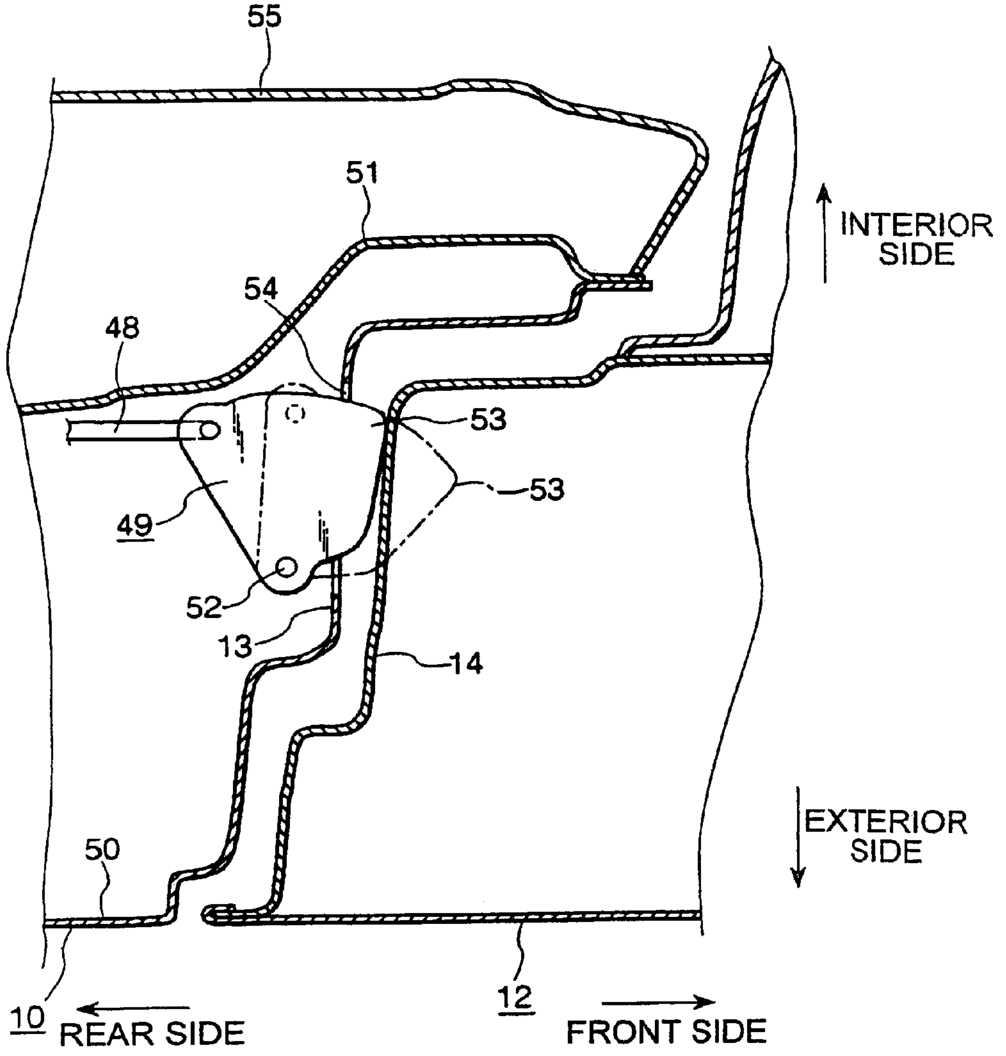
FIG. 9 is a sectional view showing a relationship between a front portion of the rear door and a rear portion of the front door when the rear door and the front door are both closed.
Figure 10:
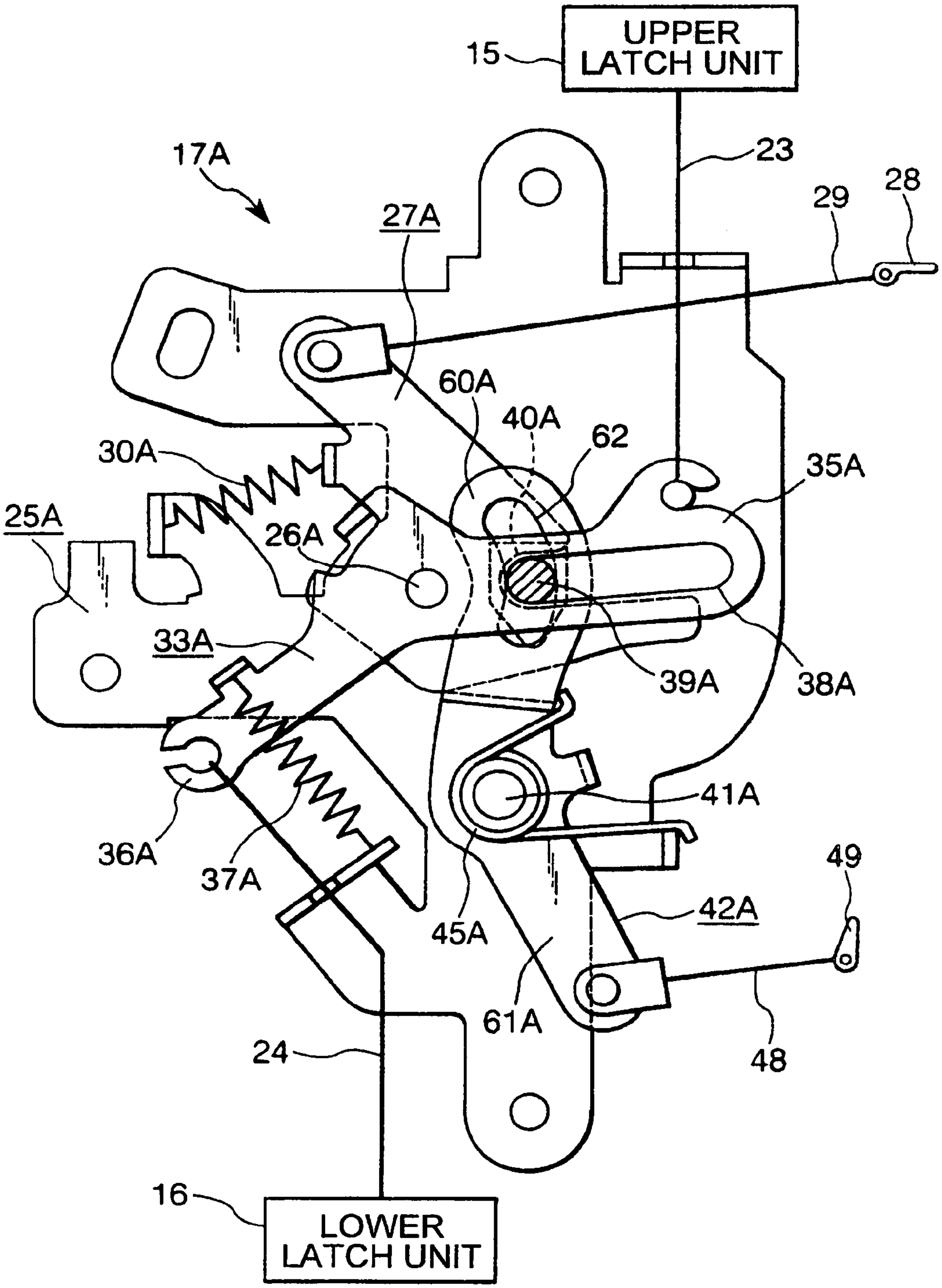
FIG. 10 is a front view of a coupling unit of a second embodiment of the present invention.
Figure 11:
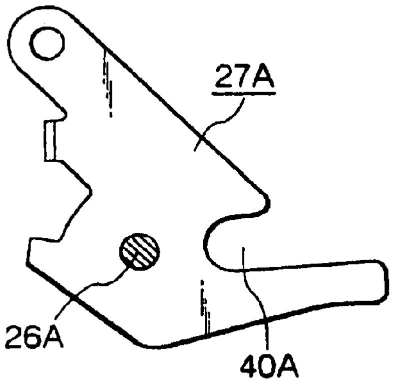
FIG. 11 is a front view of an open lever of the coupling unit of the second embodiment.
Figure 12:
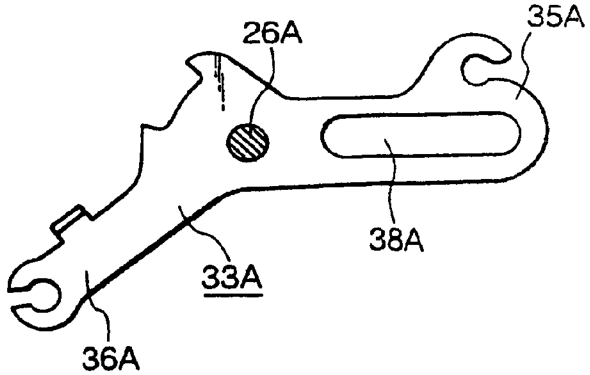
FIG. 12 is a front view of a ratchet release lever of the coupling unit of the second embodiment.
Figure 13:
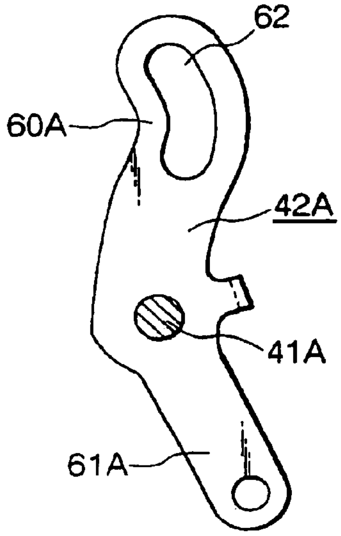
FIG. 13 is a front view of a lock lever of the coupling unit of the second embodiment.

FIG. 9 shows a relationship between a front portion of the rear door 10 and a rear portion of the front door 12 when the rear door 10 and the front door 12 are both closed. Under the door-closed condition as described above, a front panel 13 of the rear door 10 and a rear panel 14 of the front door 12 are adjacently opposed to each other in a substantially parallel state, and no door post or the like is disposed between the rear door 10 and the front door 12.

The door latch device includes an upper latch unit 15 disposed at an upper part of the door 10, a lower latch unit 16 disposed at a lower part of the door 10, and a coupling unit 17 operatively connected to the latch units 15 and 16. When the rear door 10 is closed, the latch units 15, 16 engage strikers 18, 19 fixed onto the vehicle body so as to hold the door 10 in the closed position.

Figure 8:
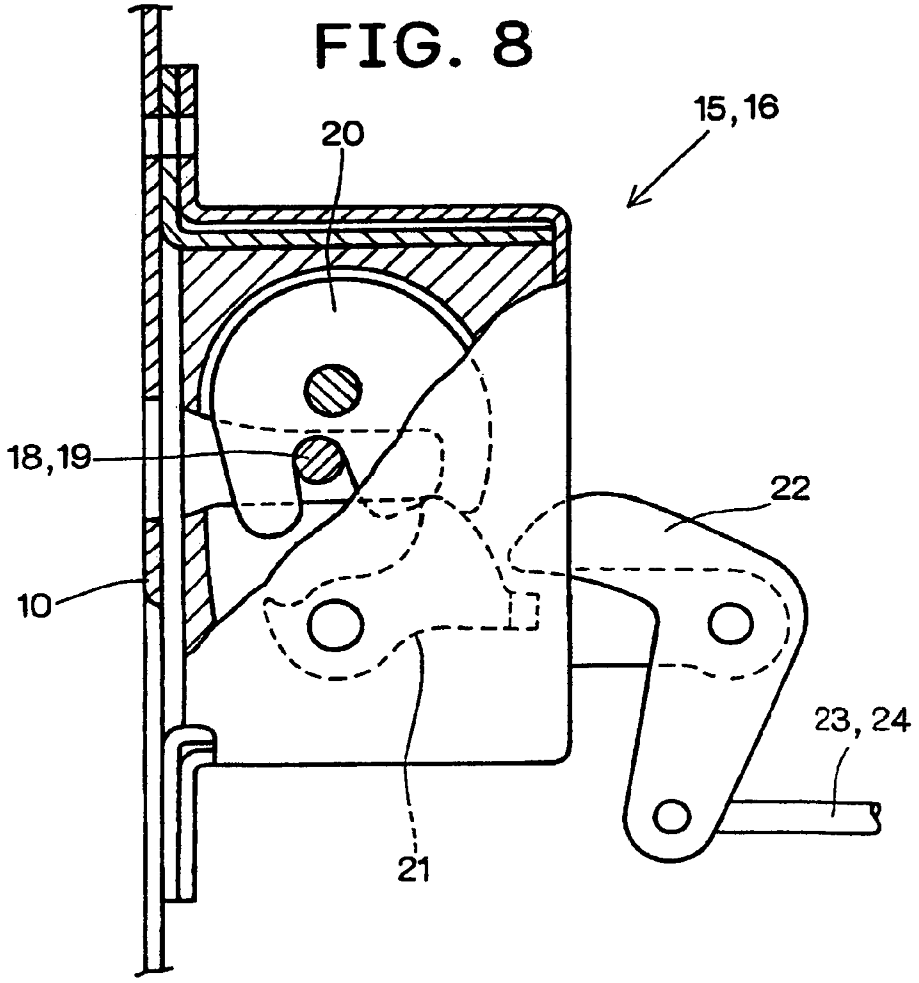
FIG. 8 is a partially longitudinal sectional view of latch unit connected to the coupling unit.

As shown in FIG. 8, each of the latch units 15, 16 has same configuration and includes latch 20 which is engageable with the striker 18 or 19, a ratchet 21 which is engageable with the latch 20, and a ratchet lever 22 as is well known. The ratchet lever 22 of each of the units 15, 16 is connected to the coupling unit 17 through connecting means 23 or 24 such as a rod or cable. When the ratchet lever 22 is rotated counterclockwise in FIG. 8, the ratchet 21 is disengaged from the latch 20 and enables the rear door 10 to open.

Figure 2:
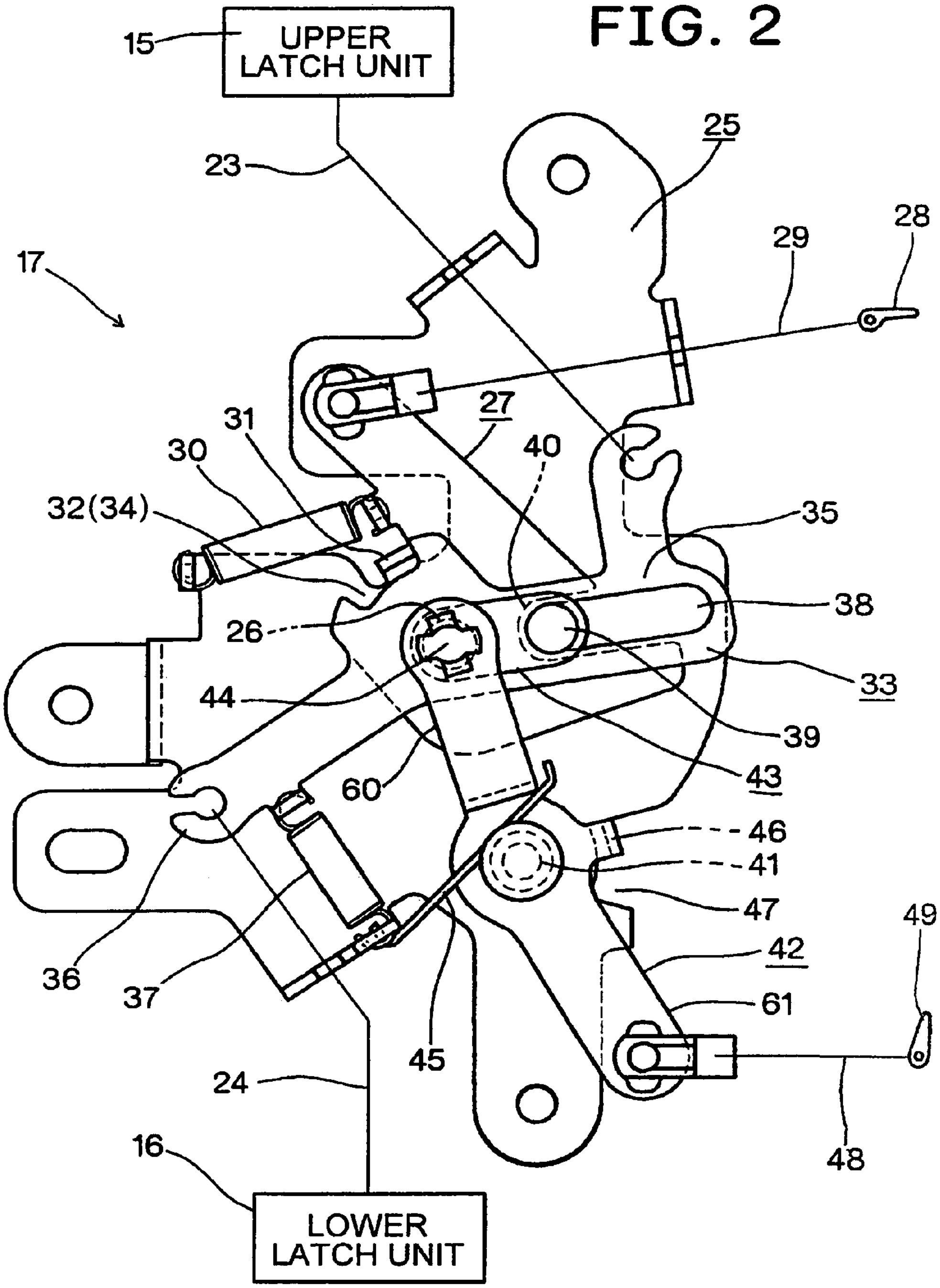
FIG. 2 is a front view of a coupling unit of the first embodiment of the present invention.
Figure 3:
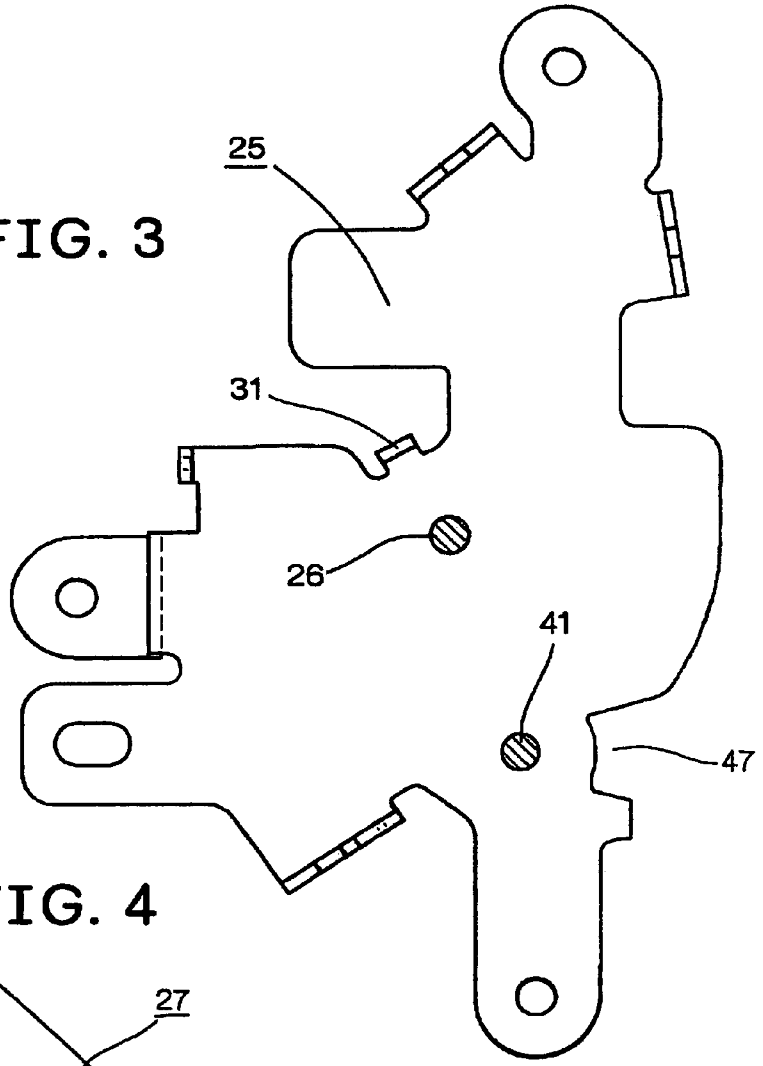
FIG. 3 is a front view of a base plate of the coupling unit.
Figure 4:
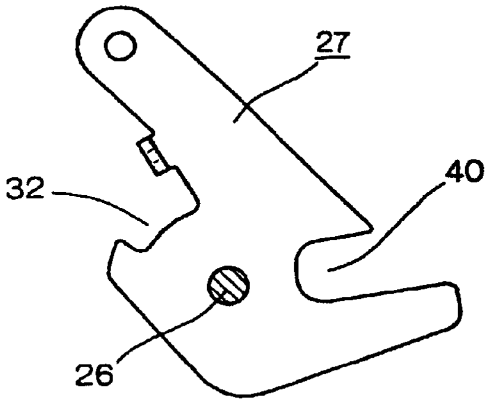
FIG. 4 is a front view of an open lever of the coupling unit.

As shown in FIG. 2, the coupling unit 17 includes a base plate 25 fixed onto the rear door 10, and an open lever 27 (FIG. 4) is pivotally mounted on the base plate 25 by a shaft 26. The open lever 27 is connected to an open handle 28 on the rear door 10 through a connecting means 29 such as a rod or cable and the like to rotate clockwise in FIG. 2 against resilience of a spring 30 in response to the door opening operation of the open handle 28. The rotational range of the open lever 27 is defined by an engagement between a bent portion 31 of the base plate 25 and an elongated recess 32 of the open lever 27.

Figure 5:
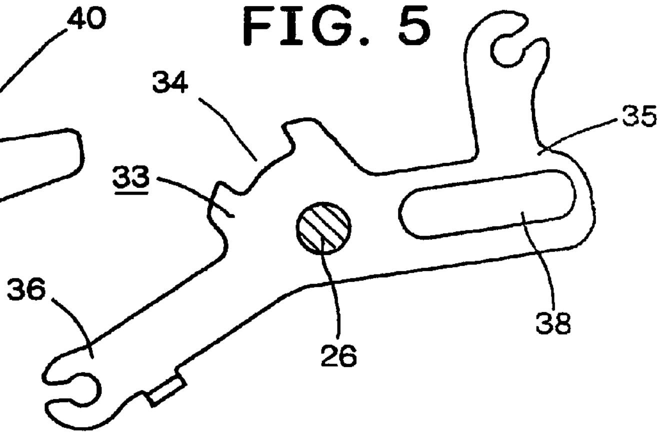
FIG. 5 is a front view of a ratchet release lever of the coupling unit.

A ratchet release lever 33 (FIG. 5) is pivotally mounted on the base plate 25 by the shaft 26 so as to overlap with the open lever 27. The rotational range of the ratchet release lever 33 is defined by an engagement between the bent portion 31 of the base plate 25 and an elongate recess 34 of the ratchet release lever 33. The ratchet release lever 33 is integrally provided with first and second arms 35, 36 which extend in a radial direction of the shaft 26. The first arm 35 is connected to the upper latch unit 15 through the connecting means 23 and the second arm 36 is connected to the lower latch unit 16 through the connecting means 24, and when the ratchet release lever 33 is rotated clockwise in FIG. 2 against resilience of a spring 37, the ratchet units 15, 16 release the strikers 18, 19.

A slot 38 extending in a radial direction of the shaft 26 is formed on the first arm 35 (or second arm 36) of the ratchet release lever 33, and a sliding pin 39 is slidably engaged with the slot 38. The sliding pin 39 is displaced, within the slot 38, between an engaged position (FIG. 2) located close to the shaft 26 and a disengaged position located apart from the shaft 26. The sliding pin 39 is engaged with a hook 40 formed on the open lever 27 when moved to the engaged position.

When the open lever 27 is rotated clockwise in response to the door opening operation of the open handle 28 in a state where the sliding pin 39 is engaged with the hook 40, the sliding pin 39 moves along the rotational path about the shaft 26 as well, thereby the ratchet release lever 33 is rotated clockwise as well to enable the rear door 10 to open. As described above, the sliding pin 39 located in the engaged position links the open lever 27 to the ratchet release lever 33.

The sliding pin 39 releases the hook 40 when moved to the disengaged position, and removes the linkage between the open lever 27 and the ratchet release lever 33.

Figure 6:
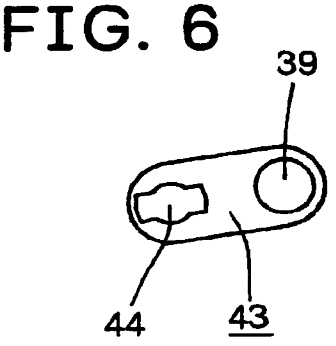
FIG. 6 is a front view of a movable member of the coupling unit.
Figure 7:
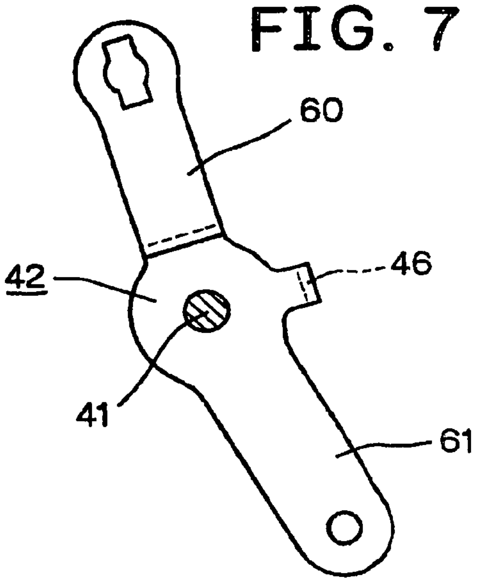
FIG. 7 is a front view of a lock lever of the coupling unit.

A lock lever 42 (FIG. 7) is pivotally mounted on the base plate 25 by a shaft 41. The lock lever 42 has an upper arm 60 and a lower arm 61, and a movable member 43 (FIG. 6) is pivotally mounted on the upper arm 60 by a T-head pin 44. The sliding pin 39 is disposed at the distal end of the movable member 43. The lock lever 42 is urged in the counterclockwise direction in FIG. 2 by a spring 45, and the rotational range of the lock lever 42 is defined by an engagement between a bent portion 46 of the lock lever 42 that engages with an elongated recess 47 of the base plate 25. The lock lever 42 shown in FIG. 2 is in an unlocked position, and the location of the sliding pin 39 in this case is the engaged position. When the lock lever 42 is rotated clockwise against resilience of the spring 45 to be displaced from the unlocked position to the locked position, the sliding pin 39 moves from the engaged position to the disengaged position.

The lower arm 61 of the lock lever 42 is connected to a detective lever 49 through connecting means 48 such as a rod or cable and the like. The detective lever 49 is arranged between an outer metal panel 50 and an inner metal panel 51 of the rear door 10 and pivotally mounted on the rear door 10 by a shaft 52. The detective lever 49 is disposed adjacent the front panel 13 of the rear door 10 and a distal end 53 of the detective lever 49 projects forwardly outwardly with respect to the rear door 10 by way of a window 54 of the front panel 13. Reference numeral 55 shows a trim panel.

When the front door 12 is closed as shown in FIG. 9, the detective lever 49 is pivoted from a position indicated by an imaginary line to a position indicated by a solid line as a result of abutment with the rear panel 14 of the front door 12, thereby the lock lever 42 rotates clockwise against resilience of the spring 45 to turn to the locked position, and the sliding pin 39 moves from the engaged position to the disengaged position. As a result, when the front door 12 is closed, the relationship between the open lever 27 and the ratchet release lever 33 turns to a non-connected condition, in which opening of the rear door 10 is prevented despite of the operation of the open handle. When the front door 12 is opened, the detective lever 49 is pushed out of the solid line position to the imaginary line position by resilience of the spring 45 and the lock lever 42 also moves back to the unlocked position as shown in FIG. 2.

Now, the operation of the first embodiment will be explained.

When the front door 12 is open, as the detective lever 49 is allowed to rotate substantially forwardly outwardly as indicated by the imaginary line in FIG. 9, the lock lever 42 is held at the unlocked position as shown in FIG. 2 by resilience of the spring 45 and the sliding pin 39 linked to the lock lever 42 keeps the state in which the sliding pin 39 engages with the hook 40 of the open lever 27. Therefore, when the open lever 27 is rotated clockwise through the door opening operation of the open handle 28, the sliding pin 39 also moves along the rotational path about the shaft 26, the ratchet release lever 33 rotates clockwise by engagement with the sliding pin 39. And the latch units 15, 16 connected to the ratchet release lever 33 by the connecting means 23, 24 release the strikers 18, 19 to enable the rear door 10 to open.

On the other hand, when the front door 12 is closed, the detective lever 49 is pushed backwardly from the imaginary line position to the solid line position as a result of abutment with the rear panel 14 of the front door 12, the lock lever 42 connected to the detective lever 49 through the connecting means 48 turns to the locked position through rotating clockwise against the resilience of the spring 45, and the sliding pin 39 disengages from the hook 40. As a result, the open lever 27 and the ratchet release lever 33 turn to a non-connected condition, in which opening of the rear door 10 is prevented despite of the door opening operation of the open handle 28.

FIGS. 10 through 15 show a coupling unit 17A in accordance with a second embodiment of the present invention. In the second embodiment a profile of a sliding pin 39A and a configuration for supporting the sliding pin differ from those in the first embodiment.

An open lever 27A (FIG. 11) and a ratchet release lever 33A (FIG. 12) in the second embodiment are pivotally mounted on a base plate 25A by a common shaft 26A similarly to the first embodiment. The open lever 27A is connected to the open handle 28 on the rear door 10 through the connecting means 29 and rotates clockwise against resilience of a spring 30A in response to the door opening operation of the open handle 28 in FIG. 10.

The ratchet release lever 33A is integrally provided with a first arm 35A and a second arm 36A which extend in a radial direction of the shaft 26A. The first arm 35A is connected to the upper latch unit 15 through the connecting means 23 and the second arm 36A is connected to the lower latch unit 16 through the connecting means 24. The ratchet release lever 33A is urged in the counterclockwise direction by resilience of a spring 37A.

A slot 38A extending in a radial direction of the shaft 26A is formed on the first arm 35A (or second arm 36A) of the ratchet release lever 33A, and the sliding pin 39A is slidably engaged with the slot 38A. The sliding pin 39A is displaced, within the slot 38A, between an engaged position (FIG. 10) located close to the shaft 26A and a disengaged position located apart from the shaft 26A. The sliding pin 39A is engaged a hook 40A formed on the open lever 27A when shifted to the engaged position, and the sliding pin 39A disengages from the hook 40A when shifted to the disengaged position.

A lock lever 42A (FIG. 13) is pivotally mounted on the base plate 25A by a shaft 41A. The lock lever 42A is urged in the counterclockwise direction by a spring 45A. The lock lever 42A is provided with an upper arm 60A and a lower arm 61A, and the upper arm 60A is installed between the open lever 27A and the ratchet release lever 33A. An arcuate slot 62 as the shaft 26A having its center is formed on the upper arm 60A of the second embodiment, and the sliding pin 39A is slidably inserted into the arcuate slot 62. The lower arm 61A is connected to the detective lever 49 through the connecting means 48.

Figure 14:
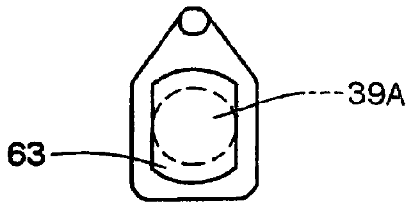
FIG. 14 is a front view of a sliding pin of the coupling unit of the second embodiment.
Figure 15:
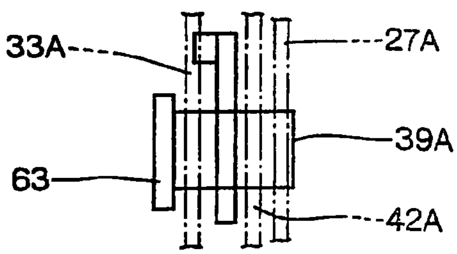
FIG. 15 is a side view of the sliding pin of the second embodiment.

In the second embodiment, as described above, the profile of the sliding pin 39A and the configuration supporting the sliding pin 39A differ from those in the first embodiment. The sliding pin 39A in accordance with the second embodiment has an integrally formed T-head 63 at the tip end thereof as shown in FIGS. 14 and 15. The sliding pin 39A is slidably mounted in the slot 38A through turning the T-head 63 after insertion through the slot 38A of the ratchet release lever 33A.

Although the profile of the sliding pin 39A and the configuration supporting it differ in the second embodiment from those in the first embodiment, there is no difference in their function.

Advantages

In accordance with the present invention, as the slot 38 (38A) in which the sliding pin 39 (39A) is slidably mounted is directly formed on the ratchet release lever 33 (33A) connected to the latch units 15, 16 through the connecting means 23, 24, members which are pivotally mounted on the base plate 25 (25A) of the coupling unit 17 may be limited to three levers, that is, the open lever 27 (27A), the ratchet release lever 33(33A), and the lock lever 42 (42A), thereby further rationalization in the manufacture of a latch device for an access panel door may be achieved as compared to that of the prior art.

What is claimed is:

1. A door latch device for a vehicle rear door of having a front panel adjacently opposed to a rear panel of a vehicle front door in a substantially parallel condition when the front door is moved to a door closed position with respect to a vehicle body, the door latch device comprising:

an upper latch unit provided at an upper part of the rear door for engagement with an upper striker fixed onto the vehicle body;

a lower latch unit provided at a lower part of the rear door for engagement with a lower striker fixed onto the vehicle body;

a base plate secured on the rear door;

a ratchet release lever pivotally mounted on the base plate by a first shaft, said ratchet release lever having a first arm extending in a radial direction of the first shaft and connected to the upper latch unit through a first connecting means and a second arm extending in a radial direction of the first shaft and connected to the lower latch unit through a second connecting means, and said ratchet release lever being removable of the engagement between the upper and lower latch units and the upper and lower strikers respectively when rotated from a standby position to a release position;

an open lever connected to an open handle of the rear door and pivotally mounted on the base plate by the first shaft;

a sliding pin movable between an engaged position in which the open lever is linked to the ratchet release lever and a disengaged position in which the open lever is not linked to the ratchet release lever;

a detective lever pivotally mounted on the rear door for rotation when abutted with the rear panel of the front door in association with closing of the rear door; and a lock lever pivotally mounted on the base plate by a second shaft and connected to the detective lever by a third connecting means;

wherein said lock lever moves from an unlocked position to a locked position when the detective lever is rotated as a result of abutment with the rear panel;

wherein said lock lever is constructed in a manner in which the lock lever shifts the sliding pin to the engaged position when the lock lever is in the unlocked position and the lock lever shifts the sliding pin to the disengaged position when the lock lever is in the locked position; and wherein said sliding pin is slidably mounted in a slot which is formed on the first arm or the second arm and extends in a radial direction of the first shaft.

* * * * *